United States Patent Office 3,278,841
Patented Oct. 11, 1966

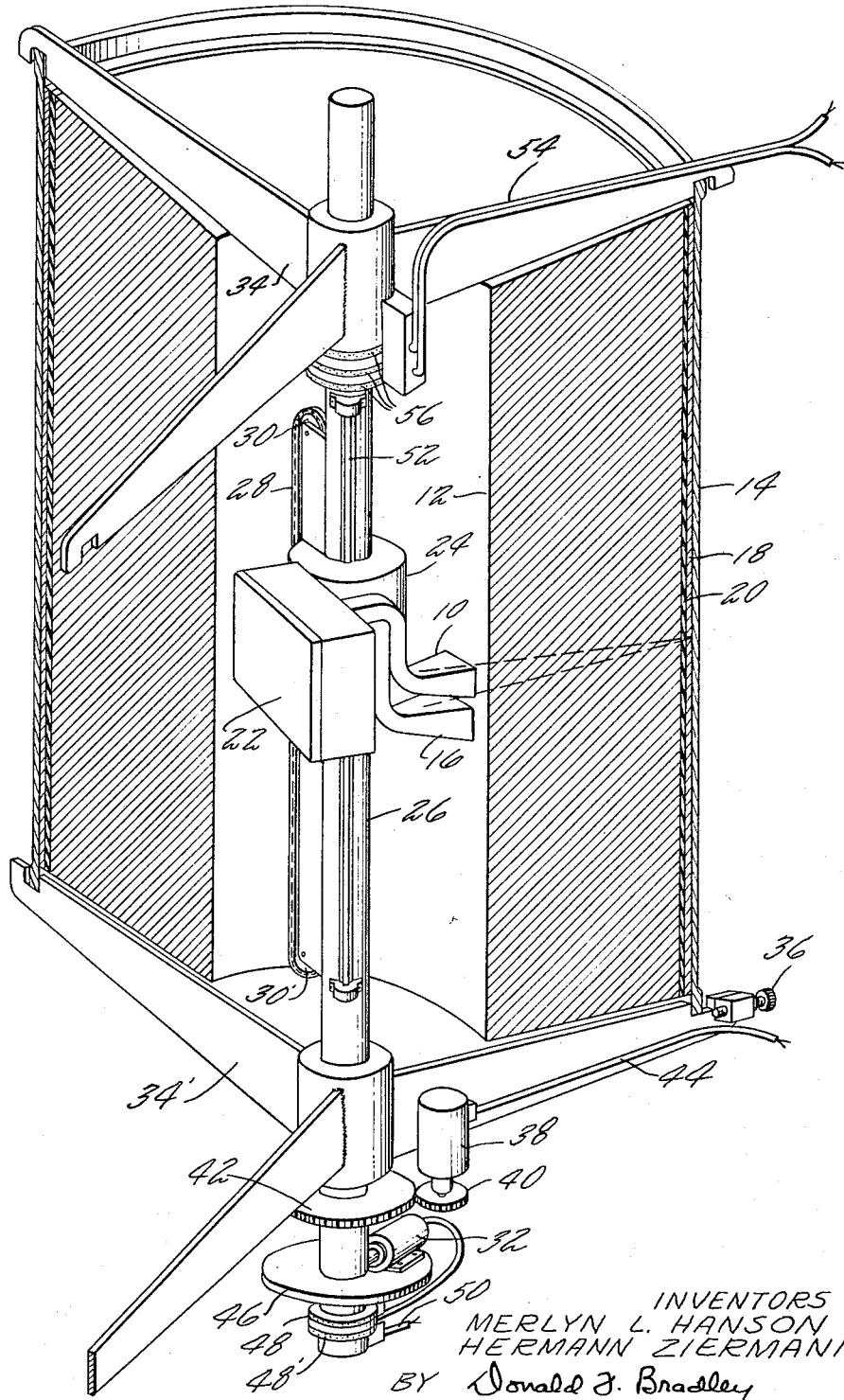

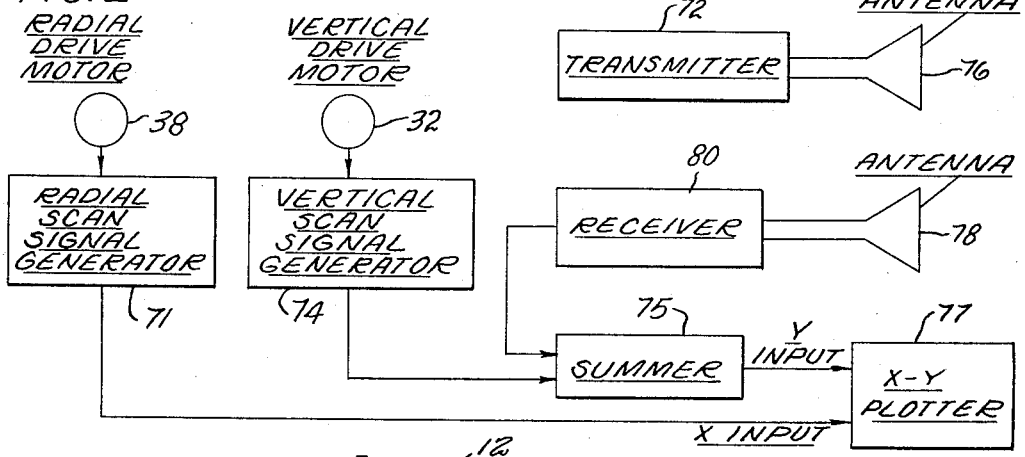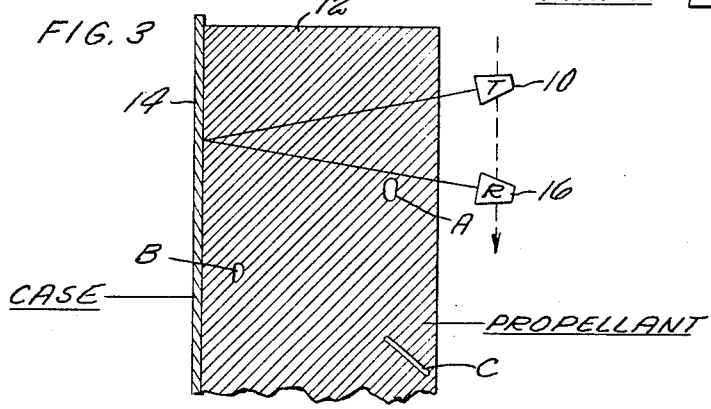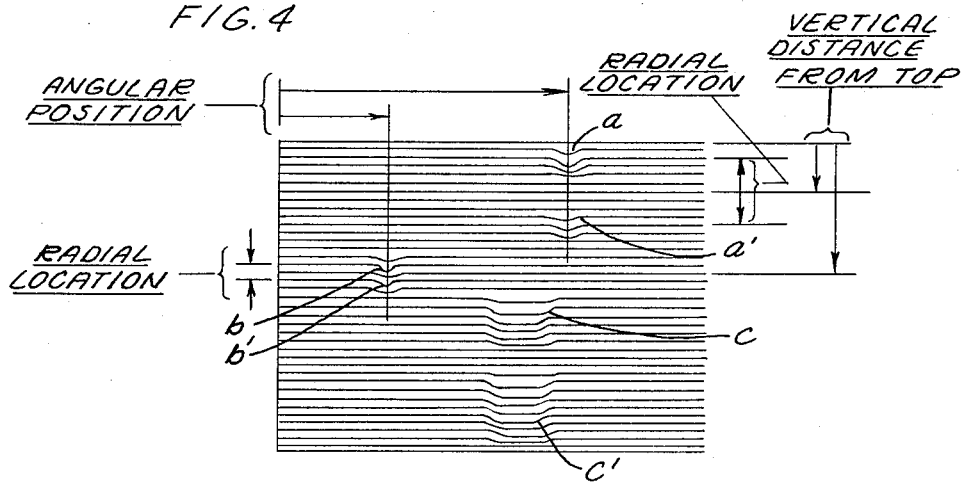

3,278,841
MICROWAVE FLAW DETECTION SYSTEM
Merlyn L. Hanson, Springfield, Mass., and Hermann Ziermann, Cheshire, Conn., assignors to United Aircraft Corporation, East Hartford, Conn., a corporation of Delaware
Filed June 27, 1963, Ser. No. 291,125
7 Claims. (Cl. 324—58.5)

This invention relates to a non-destructive testing system, and particularly to the use of microwaves for determining the presence of flaws in materials. The technique has been developed specifically for use with large solid propellant rocket motors, but need not be limited thereto.

Nondestructive testing techniques have advanced considerably in recent years. However, the demands imposed by very large solid boosters necessitate the development of new test methods. It is essential for proper performance of the solid propellant rockets that those defects within a large cast solid propellant rocket motor which could cause malfunction during motor operation be detected.

For proper burning of the solid rocket propellant it is necessary that the grain be free of cracks, soft spongy areas and voids. Any defect in the propellant grain will affect the rate of burning of the propellant and consequently the time of burning, the temperature and the thrust developed by the rocket. It is therefore essential that such defects be found so that the faults may be corrected or the particular propellant grain discarded.

The solid rocket propellant grains are composed mainly of active ingredients such as ammonium perchlorate imbedded in an inert binder material. After curing, the propellant is in the form of a viscoelastic solid which in many respects is similar to rubber. The propellant grain is encircled with concentric layers of a liner of propellant material, a layer of thermal insulation, usually rubber, and a case which is generally of steel, but which recently has been composed from fiberglas. The propellant grain geometry is normally cylindrical, but some grains are star shaped or otherwise segmented. Propellants also come in different chemical types, the most common being polyurethane and PBAN. All known propellants have the characteristic that a beam of microwave energy will pass through the grain without being completely absorbed or scattered by the propellant material, liner or insulator.

Propellant grains are frequently formed in the shape of a thick-walled tube, that is, the grain has a cylindrical void along its axis. If a sharply defined microwave beam is generated by a transmitting horn positioned in the center of the core area, the beam may be directed through the grain and reflected from the steel case to impinge on a directional receiving antenna such as another horn which is placed a short distance away from the transmitting horn. Refractions at cracks and voids in the propellant grains or separations due to unbonding between the propellant and liner, liner and insulator, or insulator and case, will cause detectable variations in the received signal. Information may thereby be obtained with such a system as to both angular and radial flaw location. The microwave transmitter and receiver may be rotated in a helical manner to scan the entire grain quite rapidly.

It is therefore an object of this invention to provide a novel nondestructive testing system and apparatus.

Another object of this invention is a novel nondestructive testing system and apparatus for solid rocket propellant grains.

Another object of this invention is a novel nondestructive testing system and apparatus for detection of separations between propellant and liner, liner and insulator, or insulator and case.

A further object of this invention is a microwave scanning system for obtaining information as to the position of voids and cracks in solid rocket propellant grains.

Another object of this invention is a novel microwave scanning system for solid rocket propellant grains in which a microwave beam is radiated from the core area of the solid propellant grain and reflected by the outside steel case of the propellant to a receiver also positioned in the core area.

Other objects and a fuller understanding of this invention may be had by referring to the following description and claims, read in conjunction with the accompanying drawings, in which:

FIGURE 1 shows a microwave scanning apparatus inserted in the core area of the solid propellant; and FIGURE 2 is a schematic block diagram of a typical microwave generating and receiving system; and FIGURE 3 shows a cross section of a solid rocket propellant grain, the grain having flaws therein; and FIGURE 4 is a plot of the output of the microwave receiver showing the angular position and radial location of the flaws.

Microwaves comprise that class of electromagnetic waves whose wavelength lies approximately between thirty centimeters and a fraction of a millimeter. Because of the extremely short wavelength of microwaves, they can be generated and transmitted as directed beams by antennae of small physical dimensions. The receiving apparatus can also be made of small dimensions. The question of apparatus dimensions is significant, in that it permits their application in the limited confines of solid propellant cores. While electromagnetic waves, such as radiofrequency waves or even those in the low frequency region can also be generated in the core area of solid propellant grains, they cannot be transmitted or directed in beams without the use of transmitting antennas or equipment having dimensions comparable to the wavelength. On the other hand, microwaves have similar attributes and their interaction with matter is generally of the same type as radiofrequency waves. The similarity of microwaves to lower frequency electromagnetic radiation is of major importance with respect to the interpretation of the reaction of microwaves with the solid propellant grain itself. Thus, for example, both radiofrequency waves and microwaves are highly reflected by metallic or other conducting media. However, insulators provide easy transmission of microwaves and have low reflecting power for them.

This invention takes advantage of the desirable properties of microwave generating apparatus, the chemical and physical structure of solid rocket propellant grains and the accompanying steel case surrounding the grain. This invention depends on a sharply defined microwave beam originating at a transmitting horn in the core area and being reflected from the outer steel case to thereby impinge on a directional receiving antenna displaced a short distance from the transmitting horn. Referring now to FIGURE 1, transmitting horn 10, which is positioned in the center or core area of the solid rocket propellant grain, generates a microwave beam which passes through the grain 12 and is reflected from the steel case 14 surrounding the grain. The reflected microwave beam passes back through the propellant grain 12 to receiving horn 16 positioned adjacent transmitting horn 10.

For a typical solid fuel rocket having an 8′ diameter grain, case 14 has a thickness of approximately ⅓ to ½ inch. The case material is steel. Immediately inside the steel case 14 is a layer of thermal insulation 18, the insulation normally being rubber, and having a thickness of approximately ¼ inch. Liner 20 is a thin layer of inert propellant. The propellant 12 is a colloidal-suspension, cross-linked-matrix material. The primary ingredients in the propellant are $NH_4ClO_4$, aluminum particles, and PBAN, (polybutyl acrylonitrile) the remainder of the propellant being composed of very small percentages of other miscellaneous compounds.

Horns 10 and 16 are mounted on a housing 22 which contains the transmitter, receiver, detector and other electronic equipment for generating and receiving the microwave. Housing 22 is physically mounted to cylindrical member 24 by means not shown. Member 24 is mounted on shaft 26 for movement relative to shaft 26. Member 24 is driven in a vertical direction along shaft 26 by chain 28, the chain being mounted on two sprockets 30 and 30′. The chain and sprockets are driven by means of motor 32 connected to the chain and sprockets through connections (not shown) which run through shaft 26. Shaft 26 is mounted for rotation within spiders 34 and 34′, the spiders having bearings therein on which the shaft rotates. The spiders are fixedly attached to the top and bottom portions of the case as shown. The spiders are fixedly attached to and aligned with the case by means of thumb screws 36. The entire shaft 26 including the cylindrical member 24, housing 22 and horns 10 and 16 are rotated within the spiders by means of motor 38. Motor 38 drives pinion gear 40, which in turn drives gear 42. Gear 42 is fixedly connected with the shaft 26. Motor 38 is energized by means of a source of A.C. power through line 44. Motor 32 is connected with platform 46, this platform also being fixedly attached to shaft 26 for rotation therewith. Motor 32 is energized by means of slip rings 48 and 48′ which receive their power from line 50. A.C. power is transmitted to the electronics in housing 22 by means of conductors 52 which are energized through A.C. line 54 through slip rings 56.

As thus described, horns 10 and 16 are rotated with shaft 26 by motor 40, and the horns are driven in a vertical direction by means of motor 32 through chain 28. In this way the horns, together with the transmitter and receiver, may be rotated in a helical manner, to thus scan the entire grain of the propellant.

Microwaves are refracted at the interface between two materials having different dielectric constants, much as light waves are refracted at the interface between materials of different density. Sufficient refraction occurs at a void or crack in the propellant, insulator, or liner to cause the path of the reflected beam to differ from that in a flawless section. By displacing the horns vertically from each other and interpreting the flaw evidence on successive rotations it is possible to derive three-dimensional flaw location information.

While some scattering and absorption of the microwave beam is caused by the aluminum particles in the propellant, sufficient energy remains in a defined beam to accomplish the purpose. Information as to voids is derived from a signal strength measurement as the receiver. Any refraction or change in absorption of the beam appears as a change in the received signal strength. Consequently, by interpreting the amplitude or signal strength of the received signal, exact information can be received as to the exact angular position, radial location, and extent of any voids, cracks or discontinuities in the propellant grain whose dimensions are of the same order of magnitude as the wavelength of the microwaves or greater.

FIGURE 3 shows a cross section of the grain material, and FIGURE 4 is a record of receiver output vs. time as the grain shown in FIGURE 3 is scanned. A and B are voids located at different angular positions but illustrated on the same cross sections to show radial locations as will become apparent. C is a crack located at a third position. The crack is roughly square, extending into the plane of the paper. Transmitting horn 10 and receiving horn 16 are separated from each other in a vertical direction. The microwave beam is generated from transmitting horn 10 and proceeds through grain 12 to be reflected back to receiver 16 by steel case 14. If both horns 10 and 16 are moved slowly in a vertical direction, starting from top and proceeding to the bottom of the grain, while the horns are being rotated and helically scanning the inside of the grain, void A will be intersected first by the beam reflected from case 14. This is shown in FIGURE 4 by $a$. As the horns proceed slowly downward, the microwave beam transmitted by horn 10 intersects void A before the wave is reflected by case 14. When the refracted beam is received by horn 16, it will be indicated at $a'$ in FIGURE 4.

Void B is positioned at a different angular position than void A as shown in FIGURE 4. Since void B is much closer to case 14, the time lag between the intersection by the original beam and by the reflected beam will be less than that for void A. In FIGURE 4, $b$ and $b'$ show the two intersections.

Crack C extends for a longer distance through the grain itself. In FIGURE 4, $c$ and $c'$ shows the angular position, radial location, and extent of the crack.

FIGURE 2 shows a simplified block diagram of the microwave electronics, including the transmitter and receiver enclosed in housing 22. The block diagram is very similar to that of a radar system, but the electronics need not be as complicated as a radar system since the scanning system of this invention senses only the magnitude or, alternatively, the phase of the reflected microwave beam rather than the time interval between the transmitted pulse and the received pulse as in a typical pulse radar system.

Referring now to FIGURE 2, transmitting antenna 76 takes the microwave energy from the transmitter 72, and radiates it in a highly directional beam. In the system of this invention, a highly directional horn antenna is used.

After the microwave beam is generated by transmitting antenna 76 and reflected from case 14, receiving antenna 78, in the form of a horn, receives the returning microwave beam and passes it to receiver 80. Since the microwave beam may have decreased in intensity because of passing through grain 12, amplifying means may be included in receiver 80. Receiver 80 may be quite simple, the only requirements being that it have a band width capable of receiving the transmitted frequencies, and a sensitivity capable of sensing the weak microwave signal.

To produce the graphic record shown in FIGURE 4, it is necessary that there is a definite relationship between geometrical points on the record and the vertical and angular position of the antennas. In order to accomplish that, radial scan signal generator 71 and vertical scan signal generator 74 are mechanically coupled respectively to radial drive motor 38 and vertical drive motor 32. Vertical scan signal generator 74 generates a D.C. voltage proportional to the average distance between the antennas and the lower end of the grain. Radial scan signal generator 71 generates a D.C. voltage proportional to the angular deviation of the antennas from a predetermined reference plane. The outputs of signal generator 74 and receiver 80 are added in summer 75 and applied to the Y input terminal of X–Y plotter 77. The output of signal generator 71 is applied to the X input terminal of the X–Y plotter. The resulting recording is not unlike a TV raster with the horizontal lines representing radial scanning paths and the vertical dimension representing vertical location of the antennas. Deviations of the horizontal lines from their normal linearity are produced by deviations in the receiver output such as those produced when a non-uniform portion of the grain is scanned by the beam.

Plotter 77 is preferably a two-dimensional graphic recorder but may be a two-channel tape recorder or other device to provide a permanent record of the signals received by antenna 78 and receiver 80. A single-channel tape recorder may be used if signal generator 71 is arranged to generate a marker pulse which may be superimposed on the recorded output of summer 75 each time one complete rotation of the horns takes place. This would facilitate the location of any flaws or discontinuities in the grain.

The relative positioning of the receiving horn with respect to the transmitting horn, in both horizontal and vertical directions, will depend on many factors such as the speed of rotation of the entire assembly, the depth and materials of the grain, and the frequency of the microwave beam. It is also apparent that the newer solid propellant grains having fiberglas cases can utilize the disclosed system by the simple expedient of placing a metallic case on the outside of the fiberglas case.

While the invention has been described as relating to a microwave beam being reflected from a metallic case, it is apparent that the invention need not be limited thereto. For example, the transmitting horn may be placed in the core of the solid rocket propellant, while the receiving horn is placed to the outside of the material, the microwave being in this case not being reflected but being passed through the material. The three-dimensional flaw indicating portion of the invention need not be lost in this case, since multiple beams or multiple scans may be used to exactly locate the flaw.

It is also apparent that other modifications may be made to the disclosure herein without departing from the scope of the claims.

We claim:

1. A nondestructive testing apparatus for determining the presence and location of flaws in a solid rocket propellant, said propellant having a hollow core along one axis thereof and a case of reflecting material covering at least a portion of the outside perimeter of said propellant, comprising a transmitter located within said core for generating a microwave beam, means for directing said beam toward a portion of said propellant covered by said case, said beam passing through a first portion of said propellant and being reflected by said case whereby said beam passes through a second portion of said propellant, a receiver located within said core for receiving said reflected beam, and indicator means connected with said receiver and responsive to variations in said microwave beam for producing an output indicative of the location of anomalies in said propellant.

2. Apparatus as in claim 1 and including scanning means for rotating said transmitter and said receiver while said transmitter and receiver are simultaneously moved along the axis of said propellant within said hollow core to thereby cause the microwave beam to scan the entire volume of said propellant.

3. Apparatus as in claim 1 in which said case of reflecting material is metallic.

4. Apparatus as in claim 2 and including a shaft inserted through said hollow core along the axis thereof, a member mounted on said shaft, means for mounting said transmitter and said receiver on said member, and means for rotating said member about said axis while said member moves along said shaft, said transmitter and said receiver thereby being moved helically within said propellant.

5. Apparatus as in claim 4 in which said transmitter is displaced a distance from said receiver along the direction of said axis.

6. Apparatus as in claim 5 in which said transmitter and said receiver each include a directional horn antenna.

7. Apparatus as in claim 1 and including means synchronizing said scanning means with said indicator means whereby said output will indicate the longitudinal and radial position of the anomalies in said propellant.

References Cited by the Examiner

UNITED STATES PATENTS

| | | |
|---|---|---|
| 2,640,190 | 5/1953 | Rines. |
| 3,079,551 | 2/1963 | Walker _____ 324—58.5 |
| 3,144,601 | 8/1964 | Slabodsky _____ 324—58.5 |

WALTER L. CARLSON, *Primary Examiner.*

A. E. RICHMOND, *Assistant Examiner.*